United States Patent [19]
Reynolds

[11] Patent Number: 5,456,447
[45] Date of Patent: Oct. 10, 1995

[54] VALVE ASSEMBLY

[75] Inventor: James A. Reynolds, Newark, Great Britain

[73] Assignee: Latty International S.A., Orsay, France

[21] Appl. No.: 129,858

[22] Filed: Sep. 29, 1993

[30] Foreign Application Priority Data

Oct. 2, 1992 [GB] United Kingdom ............. 9220785

[51] Int. Cl.⁶ .................... F16K 3/30; F16K 41/00
[52] U.S. Cl. ................. 251/214; 277/106; 137/315
[58] Field of Search ................. 251/214; 277/105, 277/106; 137/15, 315

[56] References Cited

U.S. PATENT DOCUMENTS

| | | | |
|---|---|---|---|
| 5,024,453 | 6/1991 | Suggs | 277/106 |
| 5,192,049 | 3/1993 | Ridge | 251/214 |
| 5,290,010 | 3/1994 | Ridge | 251/214 |

FOREIGN PATENT DOCUMENTS

| | | |
|---|---|---|
| 0580094 | 8/1946 | United Kingdom . |
| 0770499 | 3/1957 | United Kingdom . |
| 2029928 | 3/1980 | United Kingdom . |
| 2253661 | 9/1992 | United Kingdom . |

*Primary Examiner*—George L. Walton
*Attorney, Agent, or Firm*—Flynn, Thiel, Boutell & Tanis

[57] ABSTRACT

A valve comprises a valve stem 2 surrounded in part by a packing material 3, and compression means arranged to bring the packing material into sealing engagement with the valve stem. The compression means includes a spring assembly comprising resilient springs 21 enclosed within a housing member 22 having a closure member 23 slidably mounted within it. The housing member 22 and the closure member 23 are provided with engagement means 27,28 acting to retain the closure member 23 captive within the housing member 22.

20 Claims, 2 Drawing Sheets

VALVE ASSEMBLY

FIELD OF THE INVENTION

This invention relates to valves, and in particular to spring assemblies used to exert a compressive force on valve packing materials.

BACKGROUND OF THE INVENTION

Valves used, for example, for controlling the flow of liquids in pipelines, eg in petrochemical plants, commonly include a valve stem which passes into the valve body. The valve stem must be suitably sealed at its point of entry into the valve body, in order to prevent leakage of the liquid. The seal is usually formed by a packing material arranged around the valve stem and compressed by a sleeve known as a gland to make a tight joint. The pressure exerted by the gland keeps the packing tightly pressed against the valve stem.

In valves of this type, it is important that the pressure exerted by the gland on the valve packing is neither too great nor too small. If the pressure is too great, the valve may be difficult to operate; if the pressure is too small, leakage may occur. For this reason, it is common to use calibrated spring assemblies to act on the gland. The optimum compressive force depends inter alia on the nature of the packing material and the various dimensions of the valve components, and can be calculated. A spring assembly producing this optimum force may then be prepared and utilised.

Such spring assemblies commonly comprise a stack of annular disc springs which are Moused in a cup shaped housing. The base of the housing has a central aperture which enables the assembly to be positioned about a screw-threaded stud, one end of which is fixed in the valve body and which passes through an aperture in the gland. A support washer is then placed on top of the spring assembly and tightened with a nut. Once tightened, the stack of springs acts between the support washer and the base of the housing, exerting the required force on the gland.

A disadvantage of spring assemblies of the type described is their loose assembly. This means that the integrity of the disc spring stack is easily lost prior to installation or during maintenance work. For the correct force to be exerted, it is necessary that the correct number of disc springs be used, and also the correct sequence. If the number and/or sequence of disc springs is incorrect, insufficient force may be exerted on the packing, leading to the danger of potentially hazardous leaks. Another disadvantage is that the support washer may be over-tightened, leading to excessive compressive force on the packing and difficulties in valve operation.

There has now been devised an improved form of spring assembly for use in a valve which overcomes or substantially mitigates the above mentioned disadvantages.

SUMMARY OF THE INVENTION

According to the invention there is provided a valve comprising a valve stem surrounded in part by a packing material, and compression means arranged to bring the packing material into sealing engagement with the valve stem, the compression means including a spring assembly comprising resilient spring means enclosed within a housing member having a closure member slidably mounted within it, wherein the housing member and closure member are provided with engagement means acting to retain the closure member captive within the housing member.

The valve according to the invention is advantageous primarily in that the integrity of the spring assembly is maintained by the fact that it is enclosed within and between the housing member and the closure member. The springs are not dislodged in the event that the unit is dropped or mishandled, and the sequence of springs cannot accidentally be changed. In addition, the assembly may be supplied as a complete unit, thereby simplifying installation.

According to another aspect of the invention there is provided a spring assembly for use in association with a valve having a valve stem surrounded in part by a packing material, the spring assembly comprising resilient spring means enclosed within a housing member having a closure member slidably mounted within it, wherein the housing member and closure member are provided with engagement means acting to retain the closure member captive within the housing member.

The housing member is preferably a cylindrical cup member, the base of which preferably has a central aperture to receive a threaded stud about which the spring assembly fits.

The spring means is preferably a stack of annular disc springs of generally conventional form. The diameter of the disc springs is preferably only slightly less than the internal diameter of the cup member. This enables the walls of the cup member to act as guides, eliminating the need for special studs or spring guides.

The closure member is preferably a disc-shaped washer with a diameter slightly less than the internal diameter of the housing member. Again, the washer preferably has a central aperture to receive the threaded stud.

Apart from the spring assembly, the compression means may comprise a generally conventional gland, eg a sleeve bearing on the packing material and provided with a flange acted on by the spring means.

The engagement means for retention of the closure member within the housing member are most preferably inter-engaging formations provided on those two members. Most conveniently, the formations are one or more lugs and corresponding longitudinal recesses. The lug(s) are most preferably formed on the closure member and the recess(es) on the internal walls of the housing member. Most preferably, there are provided one pair of lugs and one pair of recesses, located at diametrically opposed positions on the closure member and the housing member respectively.

It is particularly preferred that the engagement means should be such that disengagement of the housing member and the closure member, whilst difficult or impossible during normal use, should be possible for the purposes of assembly or maintenance of the spring assembly. The longitudinal recess in the internal wall of the housing member is therefore preferably provided with a by-pass recess intermediate its ends, the by-pass extending from the longitudinal recess to the upper edge of the housing member. When removed from the valve, the resilience of the springs will urge the closure member to the upper limit of its travel within the housing member. However, by application of suitable downward force and a twisting action, the lugs on the closure member may be transferred into the by-pass recess, enabling the closure member to be removed and the assembly disassembled.

Downward travel of the closure member relative to the housing member is limited by the length of the longitudinal recess, preventing the expression of excessive force on the valve packing. This is a further novel feature of the invention, according to a further aspect of which there is accordingly further provided a valve comprising a valve stem surrounded in part by a packing material, and compression means arranged to bring the packing material into sealing engagement with the valve stem, the compression means including a spring assembly comprising resilient spring means enclosed within a housing member having a closure member slidably mounted within it, wherein there are provided stop means limiting the travel of the closure member within the housing member.

BRIEF DESCRIPTION OF THE DRAWINGS

The invention will now be described in more detail, by way of illustration only, with reference to the accompanying drawings, in which.

DETAILED DESCRIPTION

Figure 1:
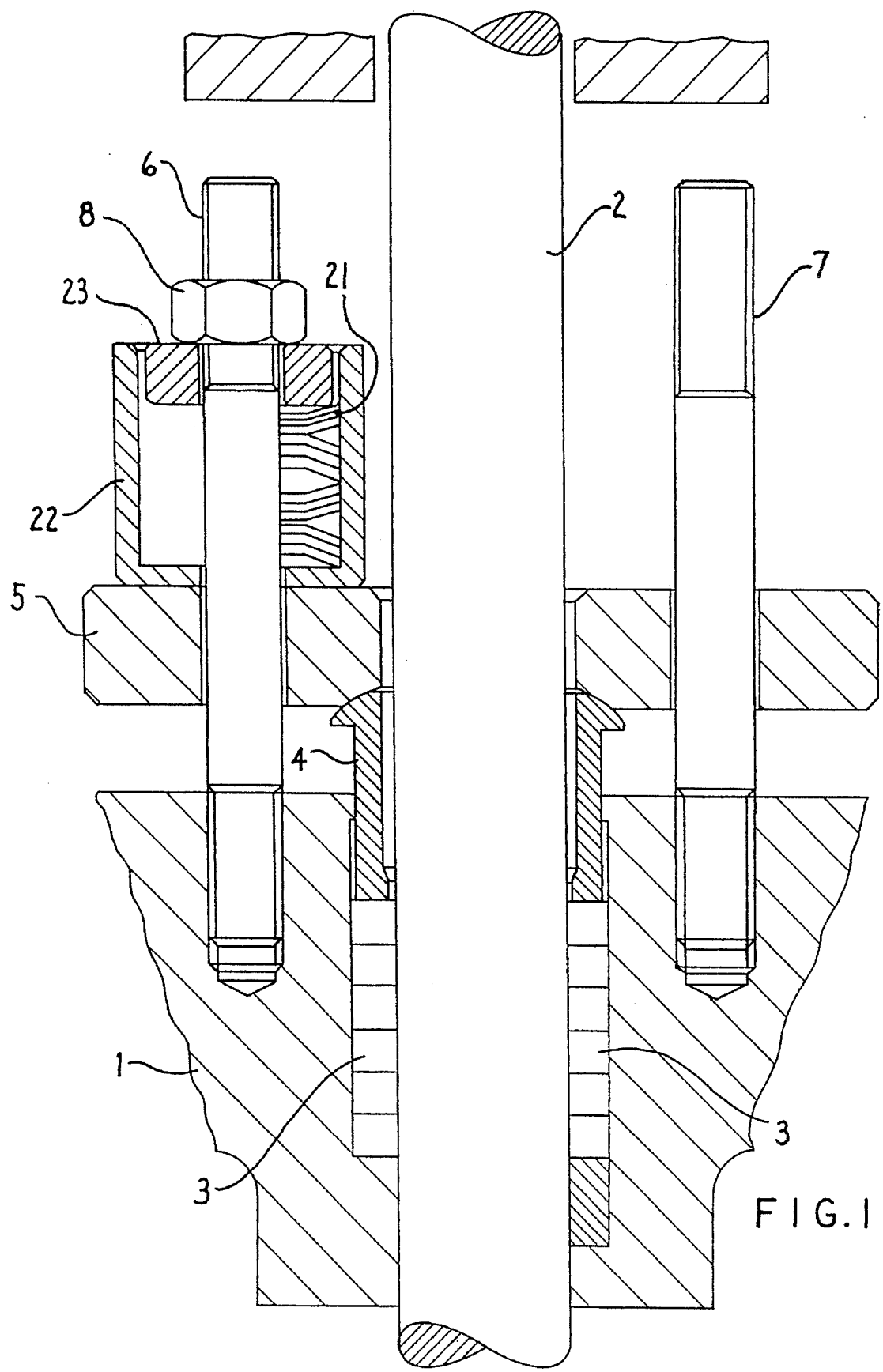
FIG. 1 is a sectional view of part of a valve according to the invention.

Referring first to FIG. 1, a valve comprises a valve body 1 in which passes a valve stem 2. The joint between the valve body 1 and the valve stem 2 is sealed by rings of packing material 3. The packing material 3 is compressed into sealing engagement with the valve stem 2 by a gland assembly comprising a cylindrical gland follower 4 (i.e. a sleeve bearing) and a gland flange 5.

Threaded gland studs 6,7 are located in threaded bores in the valve body 1 and pass through apertures in the gland flange 5. A spring unit comprising a stack of annular disc springs 21 enclosed within a cup member 22 and a support washer 23, is mounted on each of the gland studs 6,7 (in FIG. 1 only one spring unit is shown). The spring unit is clamped in place by a nut 8 threaded onto the gland stud 6. Both the cup member 22 and the support washer 23 are of stainless steel.

Figure 2:
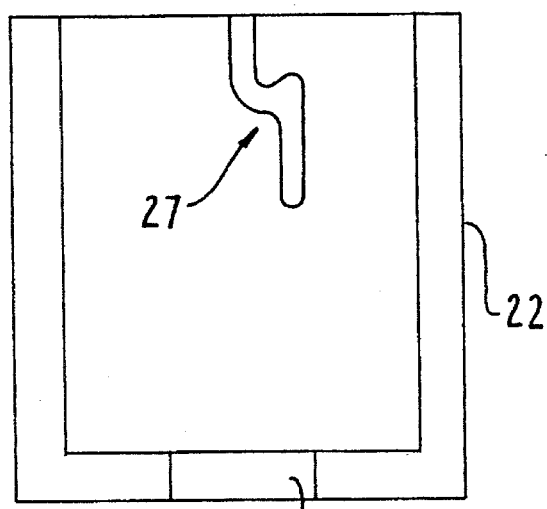
FIG. 2 is a sectional view of a cup member forming part of the valve of FIG. 1.
Figure 3:
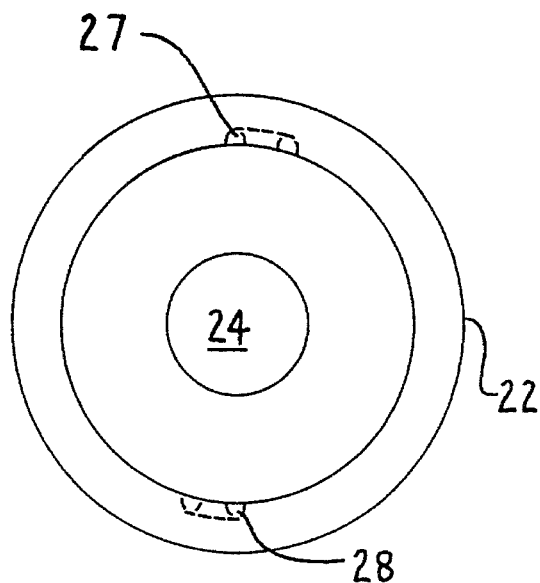
FIG. 3 is a plan view of the cup member of FIG. 2.
Figure 5:
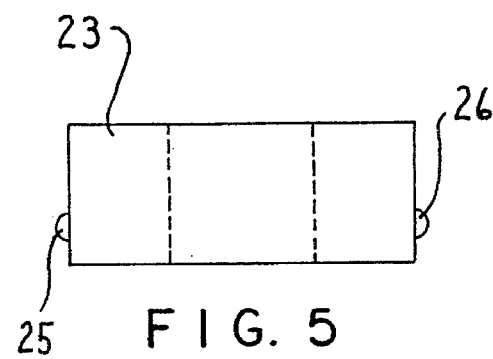
FIG. 5 is side elevation of a support washer used in conjunction with the cup member of FIG. 2.

As is seen most clearly in FIGS. 2 and 3, the cup member 22 is a hollow cylinder open at the top and having a central aperture 24 in its base to receive the gland stud 6,7. The disc springs 21 similarly have central apertures, as does the support washer 23 (shown by the dashed lines in FIG. 5).

The support washer 23 is provided at diametrically opposed positions with a pair of hemispherical lugs 25,26. The cup member 22 is provided on its internal wall, again at diametrically opposed locations, with a pair of recesses 27,28 of semicircular section.

Figure 4:
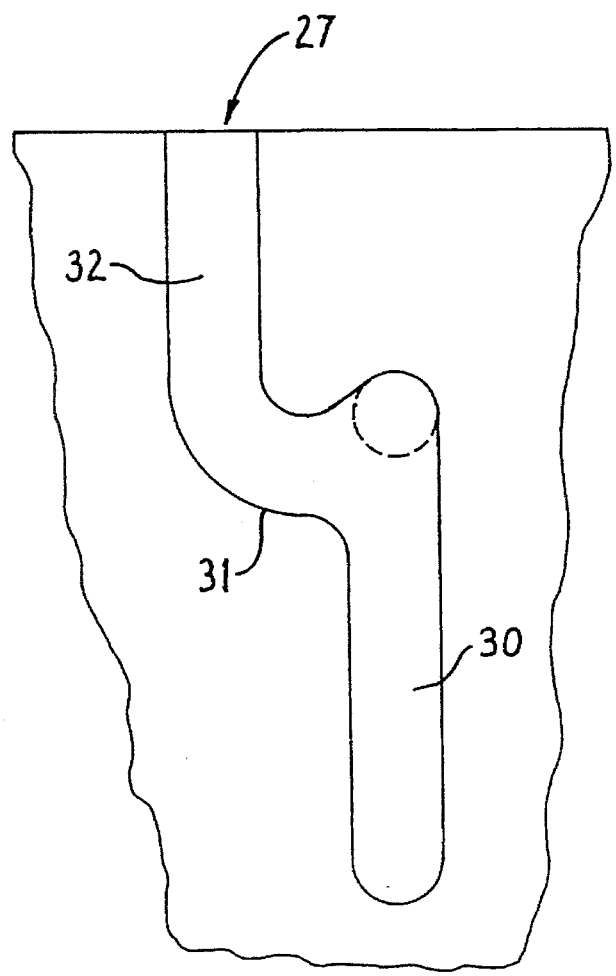
FIG. 4 is an enlarged view of part of the cup member of FIG. 2.

The form of the recesses 27,28 is shown most clearly in FIG. 4. As can be seen, the recess 27 has a first longitudinal portion 30 extending from a point a short distance below the upper edge of the cup member 22. A short distance below the upper limit of the first longitudinal portion 30 there is provided a branch portion 31 which connects to the lower end of a second longitudinal portion 32 (i.e. a by-pass recess) which extends to the upper edge of the cup member 22.

The spring unit is assembled by inserting the stack of disc springs 21 into the cup member 22. The lugs 25,26 on the support washer 23 are then aligned with the upper end of the second longitudinal portions 32 of the recesses 27,28 and the support washer 23 inserted into the cup member 22. By the application of downward pressure (eg from a suitable mechanical jig) and twisting, the support washer 23 is forced into the cup member 22, the lugs 25,26 following the line of the recesses 27,28 to the position shown by the dashed lines in FIG. 4. In this position, the resilience of the disc springs 21 retains the support washer 23 captive within the cup member 22. The downward force necessary to dislodge the support washer 23 is generally far greater than can be applied manually.

In use, the assembled spring unit is positioned over the gland stud 6,7 and the nut 8 threaded onto the stud 6,7. Prior to tightening of the nut 8, with the lugs 25,26 in the position shown by the dashed lines in FIG. 4, the upper surface of the support washer 23 protrudes somewhat from the cup member 22. The nut 8 is then tightened until the upper surface of the support washer 23 is flush with the upper edge of the cup member 22. The stack of disc springs 21 is designed and calibrated such that the required force is expressed when the support washer 23 is in this position.

I claim:

1. A valve comprising a valve body having a valve stem slidably mounted to said valve body and surrounded in part by a packing material, and compression means arranged in connective relation with said packing material to bring the packing material into sealing engagement with the valve stem by a compressive force, the compression means including a spring assembly and mounting means for facilitating mounting of said spring assembly adjacent said valve body in connective relation with said packing material to apply said compressive force, said spring assembly comprising a housing member formed with a chamber, a cover member slidably received within said chamber so as to be slidable relative to said mounting means and resilient spring means enclosed within said chamber between said housing member and said closure member to govern the compressive force being applied to said packing material, and engagement means provided on the housing member and the closure member for retaining the closure member captive within the housing member independent of said mounting means, whereby said engagement means maintains said closure member within said housing member upon release of said mounting means.

2. The valve as claimed in claim 1, wherein the housing member is a cylindrical cup member.

3. The valve as claimed in claim 2, wherein the cup member has a base with a central aperture opening into said chamber to receive a threaded stud about which the spring assembly fits.

4. The valve as claimed in claim 1, wherein the spring means comprises a stack of annular disc springs.

5. The valve as claimed in claim 4, wherein the diameter of the disc springs is only slightly less than the internal diameter of the chamber of the housing member.

6. The valve as claimed in claim 1, wherein the closure member is a disc-shaped washer with a diameter slightly less than the internal diameter of the chamber of the housing member.

7. The valve as claimed in claim 6, wherein the washer has a central aperture to receive a threaded stud extending from said valve body about which the spring assembly fits.

8. The valve as claimed in claim 1, wherein the compression means further comprises a sleeve bearing disposed on the packing material and provided with a flange acted on by the spring means.

9. The valve as claimed in claim 1, wherein the engagement means for retention of the closure member within the housing member comprises inter-engaging formations provided on those two members.

10. The valve as claimed in claim 9, wherein the formations are one or more lugs and corresponding longitudinal recesses.

11. The valve as claimed in claim 10, wherein the lug(s) are formed on the closure member and the recess(es) on the internal walls of the housing member.

12. The valve as claimed in claim 10, wherein there are provided one pair of lugs and one pair of recesses, located at diametrically opposed positions on the closure member and the housing member respectively.

13. The valve as claimed in claim 10, wherein the lug(s) are hemispherical.

14. The valve as claimed in claim 10, wherein at least one said longitudinal recess is provided with a by-pass recess intermediate opposite ends of said longitudinal recess, the by-pass recess extending from an intermediate branch portion of the longitudinal recess to the upper edge of the housing member, said branch portion having means defining an upper limit of travel for the closure member such that, when the spring assembly is removed from the valve, the resilience of the springs will urge the closure member to the upper limit of its travel within the housing member but, by application of suitable downward force and a twisting action, the lugs on the closure member may be transferred into the by-pass recess, enabling the closure member to be removed and the assembly to be disassembled.

15. A valve comprising a valve body having a valve stem slidably mounted with said valve body and surrounded in part by a packing material, and compression means arranged in connective relation with said packing material to bring the packing material into sealing engagement with the valve stem by a compressive force, the compression means including a spring assembly and mounting means for facilitating mounting of said spring assembly adjacent said valve body in connective relation with said packing material to apply said compressive force, said spring assembly comprising a housing member formed with a chamber, a cover member slidably received within said chamber so as to be slidable relative to said mounting means and resilient spring means enclosed within said chamber between said housing member and said closure member to govern the compressive force being applied to said packing material, said compression means being provided with guide means for facilitating guiding of sliding travel of said closure member relative to said housing member when said spring assembly is mounted in position by said mounting means, said guide means having stop means for limiting the travel of the closure member within the housing member independent of said mounting means, whereby said limiting of the travel of the closure member by said stop means is maintained upon release of said mounting means.

16. A valve comprising:

a hollow valve body having a valve stem slidably received therein and a packing material disposed between said valve stem and said valve body; and compression means in connective relation with said packing material for compressing said packing material into sealing engagement with said valve stem, said compression means including a spring assembly and mounting means for facilitating mounting of said spring assembly to said valve body in connective relation with said packing material to apply said compressive force, said spring assembly comprising a hollow housing member having wall means defining an opening at one end, a closure member slidably mounted within said housing member so as to be slidable relative to said mounting means and resilient spring means disposed within said housing member and enclosed by said cover member to govern the compressive force applied to said packing material, and engagement means disposed between interfacing surfaces of said housing member and said closure member for retaining said closure member within said housing member independent of said mounting means, whereby said engagement means maintains said closure member within said housing member upon release of said mounting means.

17. The valve as claimed in claim 16, wherein said engagement means comprises at least one lug on one of said housing and said closure members and at least one corresponding longitudinal recess on the other of said housing and said closure members, said longitudinal recess being adapted to receive and retain said lug upon insertion of said cover member within said housing member.

18. The valve as claimed in claim 17, wherein said at least one lug is formed on an exterior wall surface of said closure member and said at least one longitudinal recess is formed in an internal wall surface of said housing member.

19. The valve as claimed in claim 18, wherein said longitudinal recess extends from a lug-receiving first end which opens toward an upper edge of said housing member, and extends to a second end disposed a predetermined distance away from said upper edge, said longitudinal recess comprising a first portion extending from said first end to a branch portion which extends laterally relative to said first portion, and a second portion extending from said branch portion to said second end, said branch portion having means for retaining said lug thereat until a suitable twisting force is provided to said closure member and said lug is transferred from said branch portion to said first portion for removal of said closure member.

20. The valve as claimed in claim 16, wherein said housing member, said resilient spring means and said cover member have central apertures therethrough, said central apertures being in registry when said spring means and said cover member are disposed within said housing member, said mounting means including a threaded stud extending from said valve body which is adapted to be received through said central apertures and clamping means engagable on a distal end of said threaded stud for mounting said compression means to said valve body and for selectively moving said closure member toward and away from said valve body to apply said compressive force to said packing material.

* * * * *